March 9, 1965 — H. FREEMAN — 3,172,228
HOLDER FOR SNELLED FISHING HOOKS
Filed Jan. 7, 1964 — 2 Sheets-Sheet 1
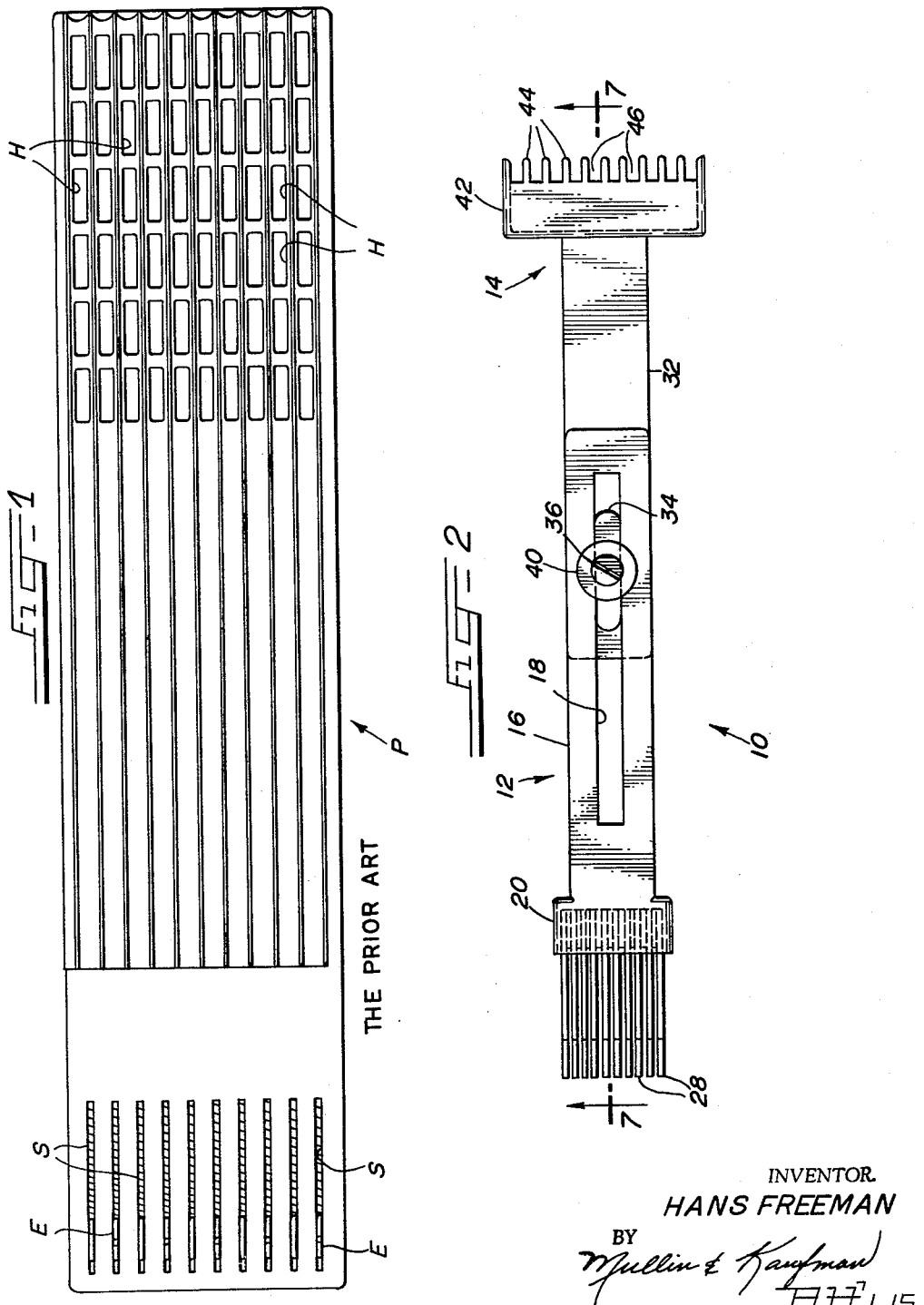
INVENTOR.
HANS FREEMAN March 9, 1965   H. FREEMAN   3,172,228
HOLDER FOR SNELLED FISHING HOOKS
Filed Jan. 7, 1964   2 Sheets-Sheet 2
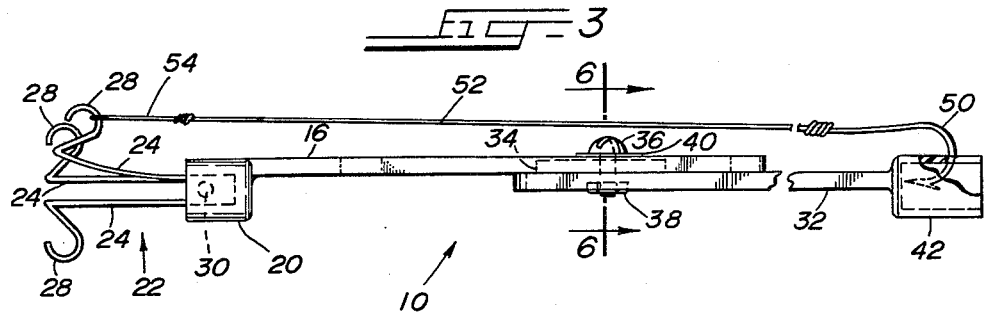
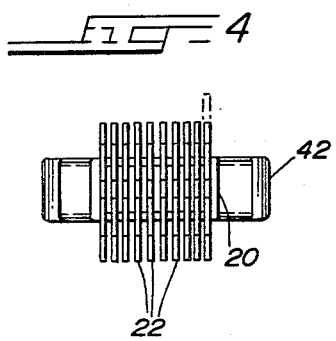
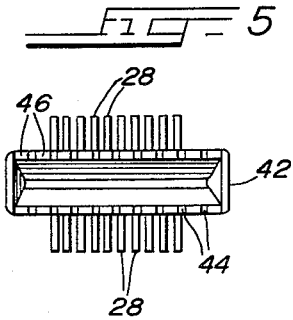
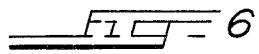
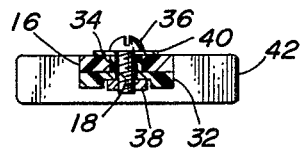
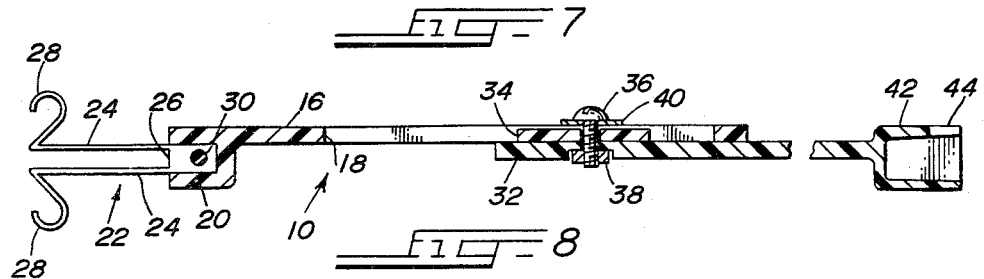
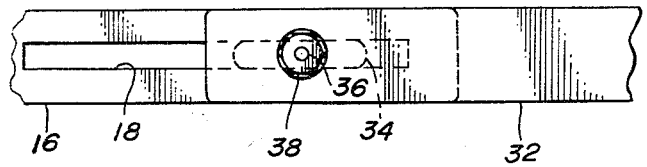
INVENTOR.
HANS FREEMAN

United States Patent Office 3,172,228
Patented Mar. 9, 1965

3,172,228
HOLDER FOR SNELLED FISHING HOOKS
Hans Freeman, Lincolnwood, Ill., assignor to Creative Plastics Engineering Company, Chicago, Ill., a corporation of Illinois
Filed Jan. 7, 1964, Ser. No. 336,207
3 Claims. (Cl. 43—57.5)

This invention relates generally to storage devices and holders for fishing tackle and the like and more particularly to an improved holder for snelled fishing hooks and similar baits and lures.

One of the most perplexing problems confronting fishermen is the handling and storage of fishing tackle and lures which have hooks incorporated therein. Despite the provision of compartmentalized and expensive tackle boxes for storing fishing gear, every fisherman has nonetheless experienced the frustration engendered by tangled hooks, pricked and bleeding fingers, and the like.

In an effort to overcome some of the described problems there have heretofore been provided devices designed specifically for the retention and storage of hooked gear such as June bug spinners, snelled fishing hooks and the like. Although the prior holders were certainly a great help, they were nonetheless characterized by certain disadvantageous features. Thus, for example, many of the prior holders had incorporated therein complicated and expensive mechanisms such as coiled springs, trigger releases, and the like. Of course, such complex mechanisms were likewise subject to breakdown. Frequently, the prior holders were so large and bulky that they occupied too much of the precious little space available in a tackle box. Others of the prior holders did not completely sheath the sharp hook tips, thus presenting a physical hazard to the user.

It is therefore an important object of this invention to provide a holder for hooked fishing tackle such as snelled fishing hooks which overcomes all of the disadvantages described hereinabove.

Another object is to afford an improved holder for snelled fishing hooks of the character described which is of substantially reduced size compared to prior similar holders.

A further object is to provide an improved holder for snelled fishing hooks of the character described having no mechanisms which are subject to breakdown such as coiled springs, trigger releases and the like.

Still another object is to afford an improved holder for snelled fishing hooks and the like of the character described which completely sheathes the hook points to eliminate all physical hazards.

Yet another object is to provide an improved holder for snelled fishing hooks of the character described which is adjustable in length for accommodating snelled fishing hooks which may vary substantially from the standardized length.

Still a further object is to afford an improved holder for snelled fishing hooks and the like of the character described which may be made entirely of corrosive resistant materials such as plastics, thereby eliminating the use of metals which are subject to rust and corrosion, particularly from salt water.

Yet a further object is to provide an improved holder for snelled fishing hooks of the character described which may be inexpensively fabricated and yet is simple to use and most efficient and durable for the purposes intended.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a plan view of a typical prior art holder drawn to scale;

FIG. 2 is a plan view of an improved holder embodying the principles of the invention and likewise drawn to scale to illustrate its size in comparison with the prior art holder;

FIG. 3 is a fragmentary side elevational view of the invention with a snelled fishing hook operationally retained thereon, and with portions being broken away to show the cooperation of parts;

FIG. 4 is an end elevational view showing the novel snell loop engaging elements;

FIG. 5 is an end elevational view from the opposite end and showing the fishing hook retaining receptacle;

FIG. 6 is a sectional view taken on the plane of line 6—6 in FIG. 3 and viewed in the direction indicated;

FIG. 7 is a fragmentary sectional view taken on the plane of line 7—7 in FIG. 2 and viewed in the direction indicated; and FIG. 8 is a fragmentary bottom plan view of the central portion of the holder.

Referring more particularly to FIGS. 2 through 8 of the drawings, it will be seen that the reference numeral 10 indicates generally an improved holder for snelled fishing hooks embodying the principles of the invention. The holder 10 comprises a pair of cooperatively connected sections indicated generally by reference numerals 12 and 14.

The section 12 comprises a flat elongated member 16 having a longitudinal slot 18 formed centrally therein. The member 16 terminates at one end thereof in a substantially rectangular shaped cup 20 wihch opens outwardly as indicated (see FIG. 7). Positioned within the cup is a plurality of loop engaging members or fingers 22. The members 22 are somewhat tuning fork or lyre shaped, having a pair of opposed arms 24, 24 connected by a yoke 26. Each of the arms 24 terminates at the free end thereof in a curved, claw-like segment 28. It will thus be appreciated that in the embodiment illustrated the ten members 22 afford twice that number, or twenty (20), claw-like segments 28.

A common shaft or pin such as 30 may be employed for connecting together the individual members 22 in spaced side-by-side relationship as indicated. Although the function of the members 22 will subsequently be more fully described, it is important to note here that the same are made from a plastic having extremely high resilience and creep resistance. Thus the arms 24 and segments 28 may be distorted or bent radically out of shape, but the material nonetheless has the physical characteristic or ability to return these members to their original position or condition. Typical of the plastic having such high resilience properties are the acetal resins, one of which is currently marketed under the DuPont trademark of "Delrin."

The holder section 14 comprises a flat elongated bar shaped member 32 of substantially the same size as the section 12. A guide bar 34 is integrally formed or other wise connected to the top surface of the member 32, and said guide bar is adapted to fit snugly but slidably within the slot 18 of the member 16. The members 16 and 32 are releasably and adjustably connected together by any suitable means such as the screw 36, nut 38 and washer 40. It will thus be appreciated that the combined length of the sections 12 and 14 may be readily adjusted as desired by simply sliding the guide bar 34 within the slot 18.

A hook retaining receptacle 42 is connected to the opposite end of the member 32. The receptacle 42 is likewise substantially rectangular in cross section, but it is important to note that the free edge thereof is provided with a plurality of spaced tynes or teeth such as 44 to afford gaps or spaces 46 therebetween. The receptacle 42 thus has a rake-like appearance (see FIG. 2) and in the embodiment illustrated, the same affords twenty (20) gaps or spaces 46; then (10) on a side (see FIG. 5).

Operation of the holder 10 may now be described with particular reference being had to FIG. 3 of the drawings. Typically, a snelled fishing hook comprises a hook 50 and a leader line or snell 52 having a loop 54 at the opposite end thereof. Since in any particular set, the snelled fishing hooks will all be of one length, the overall length of the holder 10 is first fixed by adjusting the sections 12 and 14 relative each other so that a snelled hook will be operationally retained thereon under slight tension. The snell loop 54 is hooked onto a claw segment 28 and the hook 50 then simply engaged in a space 46 so that the tip of the hook projects into the receptacle 42. It will now be observed that the snell 52 is retained under tension causing the particular arm 24 and hook segment 28 to bend slightly outwardly. In this condition, the snelled hook is efficiently retained on the holder 10, with the actual hook 50 being safely sheathed within the receptacle 42 where it cannot be engaged by the fisherman's fingers or other objects. To remove the snelled hook for use, it is of course simply necessary to apply increased tension to the arm 24 and hook segment 28 until the hook 50 is free of the receptacle 42 whereupon the snelled hook may be readily removed from the holder.

In the embodiment illustrated, twenty snelled hooks may be operationally retained in the same manner described. When the length of the particular snelled hooks being used changes, it is simply necessary to adjust the overall length of the holder to accommodate those hooks. It has been found however, that the resiliency of the fingers 22 in and of itself affords a sufficient amount of adjustability to accommodate virtually all commonly used snelled fishing hooks without the necessity of adjusting the sections 12 and 14 relative each other.

From the foregoing description and drawings, it should be apparent that I have provided a novel and improved holder for snelled fishing hooks which eliminates many of the disadvantageous features of the prior art devices. In this respect, attention is directed to FIGS. 1 and 2 of the drawings where a typical prior art device P of twenty hook capacity is compared in scale with the subject invention. It will additionally be noted that the prior art device P incorporated metal loop engaging elements E and coiled springs S and a plurality of space consuming slots or holes H for accommodating snelled hooks of varying lengths.

It will of course be appreciated that while the invention has been described as having a capacity of twenty snelled fishing hooks, holders capable of retaining any desired number of hooks may likewise be made. Moreover, in addition to the described efficiency and ease of operation of the invention, the same may be most inexpensively fabricated from such corrosive resistant materials as ordinary moldable plastics.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A holder for snelled fishing hooks or the like comprising first and second elongated members, means adjustably connecting said members together for longitudinal movement relative each other, a plurality of resilient claw-like fingers connected to the free end of said first member, an open ended receptacle at the free end of said second member adapted to sheathe the tips of a plurality of fishing hooks therein, each of said fingers and said receptacle cooperating to releasably retain under tension a snelled fishing hook or the like therebetween, said means comprising portions of said first member with a longitudinal slot formed therein, a guide bar adjacent the inner end of said second member and positioned snugly but slidably within said slot, and releasable locking means operationally retaining said guide bar within said slot.

2. A holder for snelled fishing hooks or the like comprising a first flat elongated member having a longitudinal slot formed therein, a second flat elongated member, a guide bar on said second member adjacent one end thereof, screw means connecting said members together in superposed relationship with said guide bar snugly but slidably positioned in said slot whereby the total length of said connected members may be adjusted, an open ended cup connected to the free end of said first elongated member, a plurality of resilient loop engaging members positioned in said cup, each of said loop engaging members comprising a pair of divergent elongated arms and a hooked segment at the free end of each of said arms, said arms and hooked segments capable of resilient outward motion, an open ended receptacle connected to the free end of said second elongated member, and a plurality of spaced tynes on said receptacle affording a plurality of outwardly opening spaces, each of said hooked segments adapted to engage a snell loop and each of said spaces adapted to accommodate a fishing hook therein whereby to releasably retain a snelled fishing hook therebetween with the tip of said hook completely sheathed within said receptacle.

3. A holder for snelled fishing hooks or the like comprising a pair of elongated members, means adjustably connecting said members together for longitudinal movement relative each other, a plurality of fingers connected to the free end of one of said members, an open ended receptacle at the free end of the other of said members, said receptacle adapted to sheathe the tips of a plurality of fishing hooks therein, each of said fingers and said receptacle cooperating to releasably retain under tension a snelled fishing hook or the like therebetween, said means comprising portions of one of said members with a longitudinal slot formed therein, a guide bar slidably positioned within said slot and adjacent the inner end of said other member, and releasable locking means operationally retaining said guide bar within said slot.

References Cited by the Examiner
UNITED STATES PATENTS

| | | | |
|---|---|---|---|
| 566,595 | 8/96 | Magnuson | 43—57.5 |
| 595,998 | 12/97 | Garland | 43—57.5 |
| 1,451,256 | 4/23 | Gardner | 43—57.5 |
| 2,804,717 | 9/57 | Ripperdan | 43—57.5 |

SAMUEL KOREN, *Primary Examiner.*

ABRAHAM G. STONE, *Examiner.*